US011912062B1

(12) United States Patent
Suliman et al.

(10) Patent No.: US 11,912,062 B1
(45) Date of Patent: Feb. 27, 2024

(54) EXPANDING TIRE RIM SYSTEM

(71) Applicants: Alex Suliman, Newark, OH (US); Amjad Suliman, Newark, OH (US); Moyed Suliman, Newark, OH (US)

(72) Inventors: Alex Suliman, Newark, OH (US); Amjad Suliman, Newark, OH (US); Moyed Suliman, Newark, OH (US)

( * ) Notice: Subject to any disclaimer, the term of this patent is extended or adjusted under 35 U.S.C. 154(b) by 114 days.

(21) Appl. No.: 17/349,532

(22) Filed: Jun. 16, 2021

Related U.S. Application Data

(60) Provisional application No. 63/039,605, filed on Jun. 16, 2020.

(51) Int. Cl.
| | |
|---|---|
| *B60C 11/14* | (2006.01) |
| *B60B 15/10* | (2006.01) |
| *B60C 11/16* | (2006.01) |
| *B60B 25/22* | (2006.01) |

(52) U.S. Cl.
CPC ............. *B60B 15/10* (2013.01); *B60B 25/22* (2013.01); *B60C 11/1612* (2013.01); *B60B 2900/551* (2013.01)

(58) Field of Classification Search
CPC . B60C 11/16; B60C 11/1606; B60C 11/1612; B60C 11/14; B60C 11/1618; B60C 27/02
See application file for complete search history.

(56) References Cited

U.S. PATENT DOCUMENTS

| | | | |
|---|---|---|---|
| 2,467,482 A | 4/1949 | Hutchings | |
| 2,781,813 A * | 2/1957 | Ferguson | B60C 11/1612 152/208 |
| 2,840,418 A | 6/1958 | Findley et al. | |
| 3,672,421 A * | 6/1972 | Anderson | B60C 11/1612 152/208 |
| 3,872,908 A * | 3/1975 | Einarsson | B60C 11/1612 152/208 |
| 3,950,032 A | 4/1976 | Miller | |
| 4,515,411 A | 5/1985 | Taylor | |
| 6,837,104 B2 | 1/2005 | Sapir | |
| 8,801,107 B2 | 8/2014 | Schmid et al. | |
| 9,919,555 B2 | 3/2018 | Wippler | |
| 2018/0223878 A1* | 8/2018 | Antonioni | F15B 15/1457 |

FOREIGN PATENT DOCUMENTS

DE 3943054 A * 7/1991 ......... B60C 11/1612

OTHER PUBLICATIONS

U.S. Appl. No. 62/763,515, filed Aug. 14, 2001, F. B. Taylor.

* cited by examiner

*Primary Examiner* — Cedrick S Williams
(74) *Attorney, Agent, or Firm* — Cramer Patent & Design PLLC; Aaron R. Cramer

(57) ABSTRACT

An expanding tire rim comprises an inner hub in hydraulic communication with a plurality of arms having curved outer rim sections. When activated by a user the hydraulic system permits the diameter of the outer rim to expand. Each arm has a plurality of tire retaining spikes.

1 Claim, 6 Drawing Sheets

EXPANDING TIRE RIM SYSTEM

RELATED APPLICATIONS

This application claims the benefit of U.S. Provisional Application No. 63/039,605, which was filed Jun. 16, 2020, the entire disclosures of which are incorporated herein by reference.

FIELD OF THE INVENTION

The present invention relates to a selective means for expanding an effective diameter of a tire rim to aid in vehicle operation.

BACKGROUND OF THE INVENTION

Those of us who live in areas where the winter climate brings snow, sleet and ice know all too well of the hazards associated with driving an automobile under these conditions. Inclement weather can cause roads and highways to become extremely slippery in literally a matter of minutes and without warning. While plowing the snow from road surfaces and applying salt or sand helps to make them safer, in most cases it is impossible to keep up with the weather and the roads are left in an unsafe condition.

Additionally, many people become stuck in snow drifts and icy streets as well. Finally, these same problems occur on rutted roads or in extremely muddy conditions. While studded snow tires can be used, they are noisy when used on dry pavement, suffer for poor handling, and can cause damage to the pavement surface itself. Accordingly, there exists a need for a means by which vehicles can safely operate on icy, snowy and/or muddy road surfaces. The development of the expandable tire rim system fulfills this need.

SUMMARY OF THE INVENTION

The principles of the present invention provide for an expandable tire rim system having a pneumatic tire mounted on a rim, a tread pattern disposed on a wear surface of the pneumatic tire and, a plurality of extendable studs which extend from the wear surface of the pneumatic tire. An outward surface of the extendable studs is each flush with the wear surface of the pneumatic tire. An interior of the rim may house a plurality of hydraulic actuators arranged in a radial pattern. Each of the hydraulic actuators may be removably connected to a rotating manifold by a hydraulic hose. The electrical power may flow in a parallel circuit manner to the dash-mounted switch which controls operation of a hydraulic valve which is in removable fluid communication between the hydraulic pump and the rotating manifolds.

The controlled hydraulic power may then flow to each of the rotating manifolds located at the pneumatic tire. Each of the hydraulic actuators drive a piston that may be mechanically and removably coupled to a respective shoe assembly. Each of the pistons may be in an extended position as it drives the respective shoe assemblies outward along the shoe travel path. The respective shoe assemblies may be positioned within the tire and allow for the expandable tire rim system to be pressurized with air. Each of the respective shoe assemblies may extend outwardly and inwardly along a shoe travel path. Each of the respective shoe assembles may not contact the extendable studs and allows for flexing of a tire sidewall and produce an improved smooth ride.

Each of the respective shoe assemblies may drive the extendable studs outward where they protrude from the wear surface. When increased traction may no longer required, a dash-mounted switch deactivates the respective shoe assemblies are retracted and allowing the extendable studs to retract back into the wear surface. The extendable stud may be held in position by a flexible membrane that connects an inward surface of the pneumatic tire to the tread pattern. The inward surface of each of the extendable studs may rest against outer surface of the flexible membrane. The inner surface of the flexible membrane may be contacted by the shoe assembly and with the shoe assembly.

The extendable stud may travel outward when the flexible membrane travels outward due to a force presented to it by the shoe assembly. The extendable stud may remain attached to the pneumatic tire by the flexible membrane that is in a folded state, while retaining its air-tight properties. The flexible membrane may be air-tight to allow for pressurization of the pneumatic tire. Electrical power may be provided at an electrical power point energized with a equipped motor vehicle having the expandable tire rim system ignition on. Electrical power may then flow to an electric motor which is mechanically and removably coupled to a hydraulic pump which is located on an interior of the equipped motor vehicle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
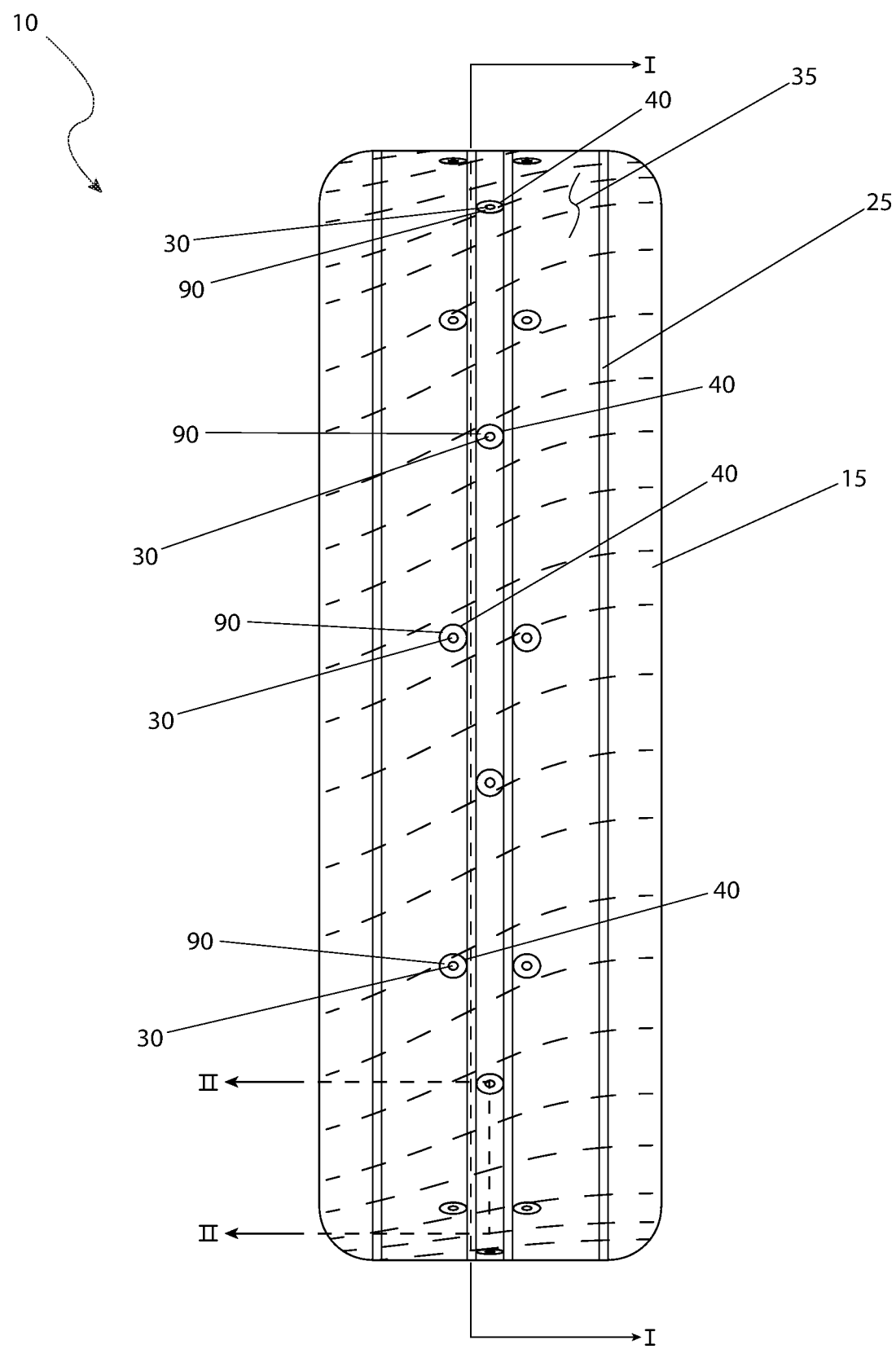
FIG. 1 is a front view of the expandable tire rim system, according to the preferred embodiment of the present invention.

DESCRIPTIVE KEY 10 expandable tire rim system
15 tire
20 rim
25 tread pattern
30 extendable stud
35 wear surface
40 hydraulic actuator
45 rotating manifold
50 hydraulic hose 55 piston
60 shoe assembly
65 shoe travel path "s"
70 tire sidewall
75 dash-mounted switch
80 outward surface
85 inward surface
90 flexible membrane
95 electrical power point
100 electric motor
105 hydraulic pump
110 hydraulic valve

DESCRIPTION OF THE INVENTION

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the expandable tire rim system according to the preferred embodiment of the present invention is disclosed. The expandable tire rim system (herein also described as the "system") 10, includes a pneumatic tire 15 mounted on a rim 20 (not visible in FIG. 1 due to illustrative limitations). While the tire and the rim 20 are displayed as a conventional passenger car tire, it is envisioned that the learnings of the present invention could be applied to almost all tires including passenger car tires, SUV tires, truck tires, semi tires, and large off-road construction equipment tires. The tire is provided with a tread pattern 25 which can be provided in multiple versions, such as all-season, winter, performance, or the like, to suit the preferences of the user. The surface of the tire 15 is provided with a plurality of extendable studs 30 that extend and retract from the wear surface 35 of the tire 15.

Figure 2:
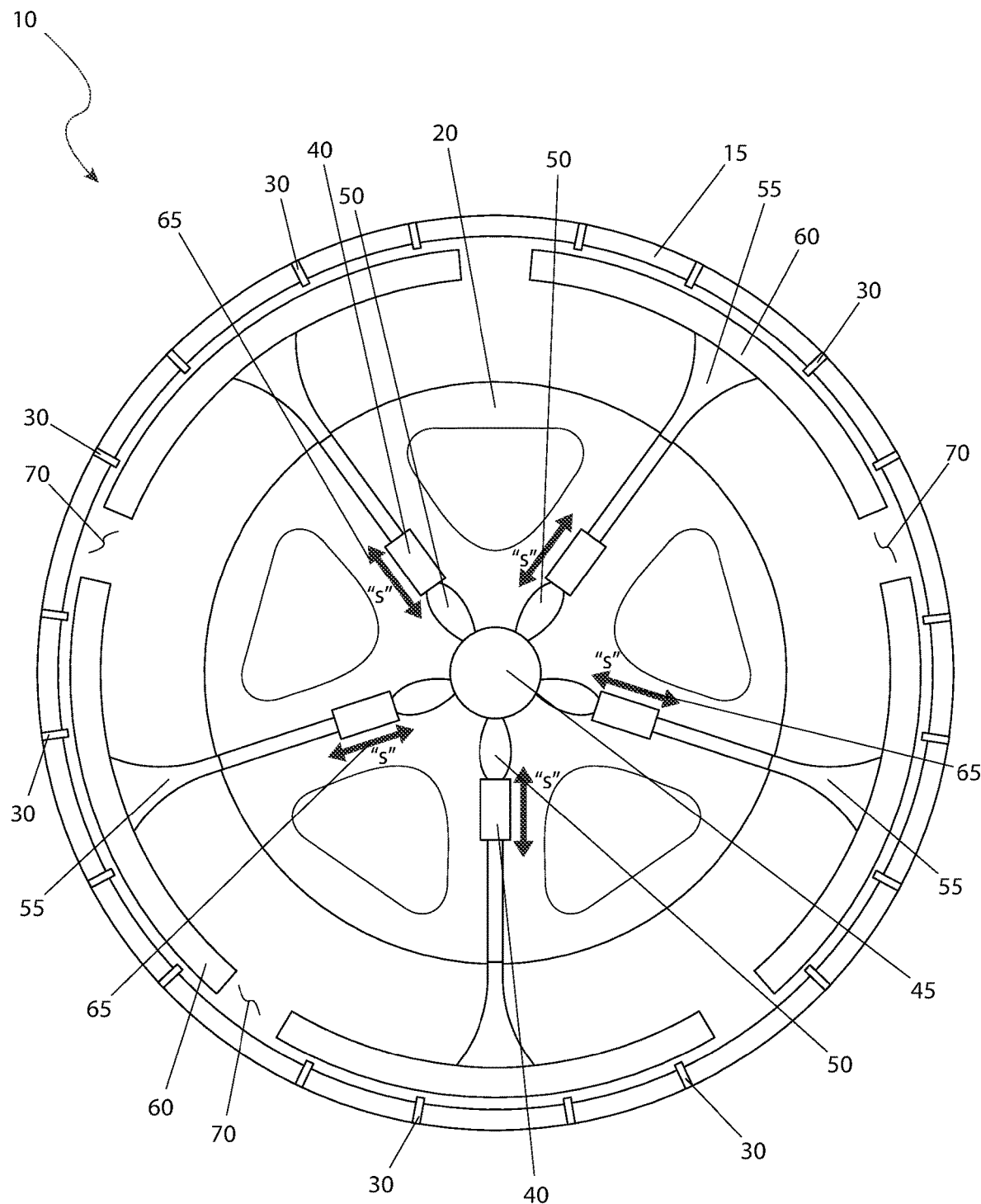
FIG. 2 is a sectional view of the expandable tire rim system, in a retracted state, as seen along a Line I-I, as shown in FIG. 1, according to the preferred embodiment of the present invention.

Referring next to FIG. 2, a sectional view of the system 10, in a retracted state, as seen along a Line I-I, as shown in FIG. 1, according to the preferred embodiment of the present invention is depicted. This view discloses the rim 20 mounted in the center of the tire 15 as aforementioned described. The interior of the rim 20 houses at least two (2) or preferably more (here depicted with five (5)) hydraulic actuators 40 arranged in a radial pattern. Each hydraulic actuator 40 is removably connected to a rotating manifold 45 by a hydraulic hose 50. Each hydraulic actuator 40 drives a piston 55 that is mechanically and removably coupled to a respective shoe assembly 60. These shoe assemblies 60 are positioned within the confines of the tire 15 and allow for the system 10 to be pressurized with air as is commonly expected for pneumatic tires. Each shoe assembly 60 extends outwardly and inwardly along a shoe travel path "s" 65. In its retracted state as shown in FIG. 2, each shoe assembly 60 does not contact any extendable stud 30 and allows for flexing of the tire sidewall 70 and thus an improved smooth ride for the equipped vehicle.

Figure 3:
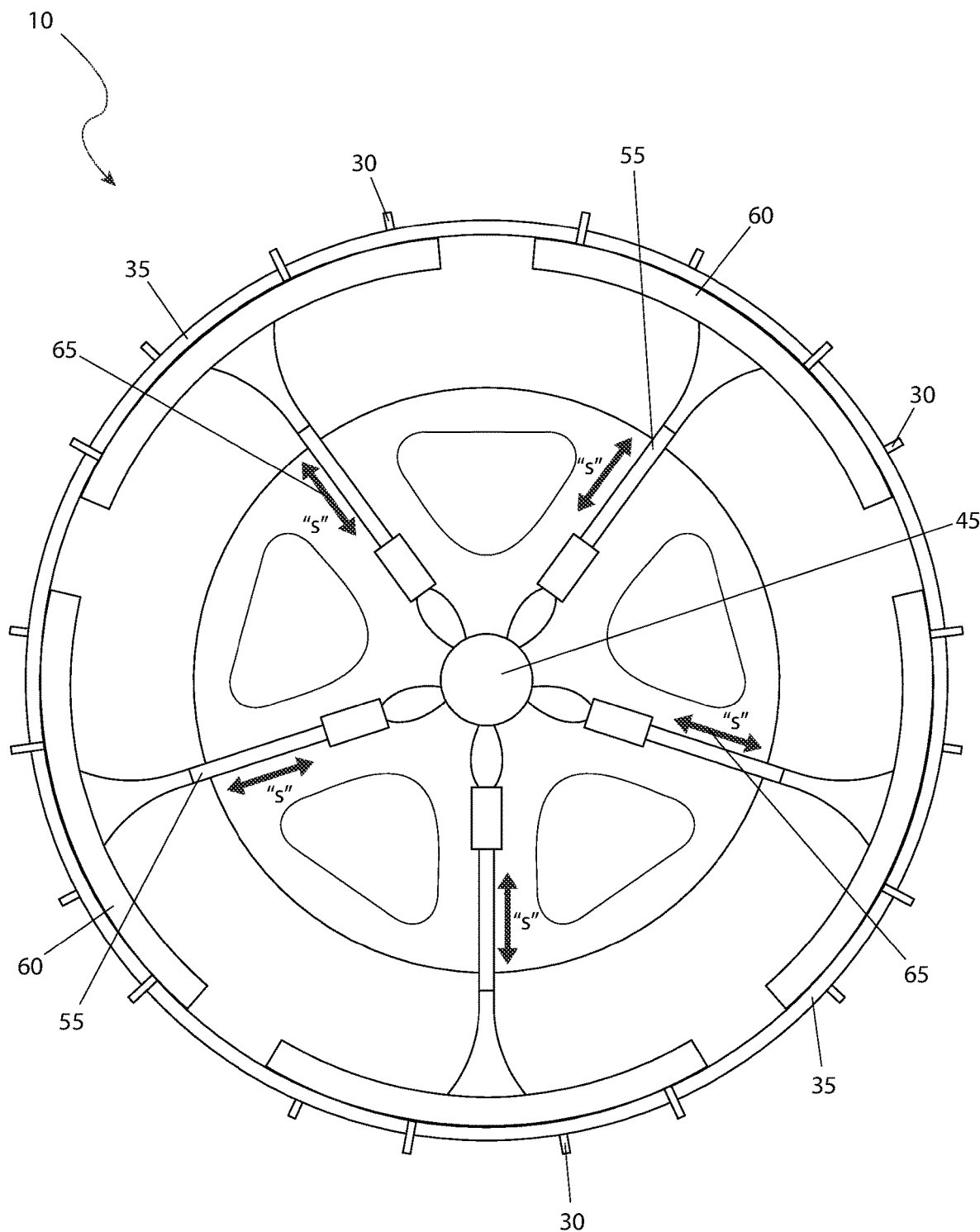
FIG. 3 is a sectional view of the expandable tire rim system, in an extended state, as seen along a Line I-I, as shown in FIG. 1, according to the preferred embodiment of the present invention.

Referring now to FIG. 3, a sectional view of the system 10, in an extended state, as seen along a Line I-I, as shown in FIG. 1, according to the preferred embodiment of the present invention is shown. This view provides clarification on the extended position of each piston 55 as it drives an individual shoe assembly 60 outward along the shoe travel path "s" 65. This configuration thus permits each shoe assembly 60 to drive the extendable studs 30 outward as well where they protrude from the wear surface 35 as shown. This protrusion is envisioned to provide increased traction on ice, snow, dirt, mud, and other traction poor surfaces. Such deployment can occur while the vehicle is in motion and is controlled by a dash-mounted switch 75 (not shown in this figure). When such increased traction is no longer required, the user can deactivate the dash-mounted switch 75, thus retracting the shoe assemblies 60 and allowing the extendable studs 30 to retract back into the wear surface 35 (as shown in FIG. 2).

Figure 4:
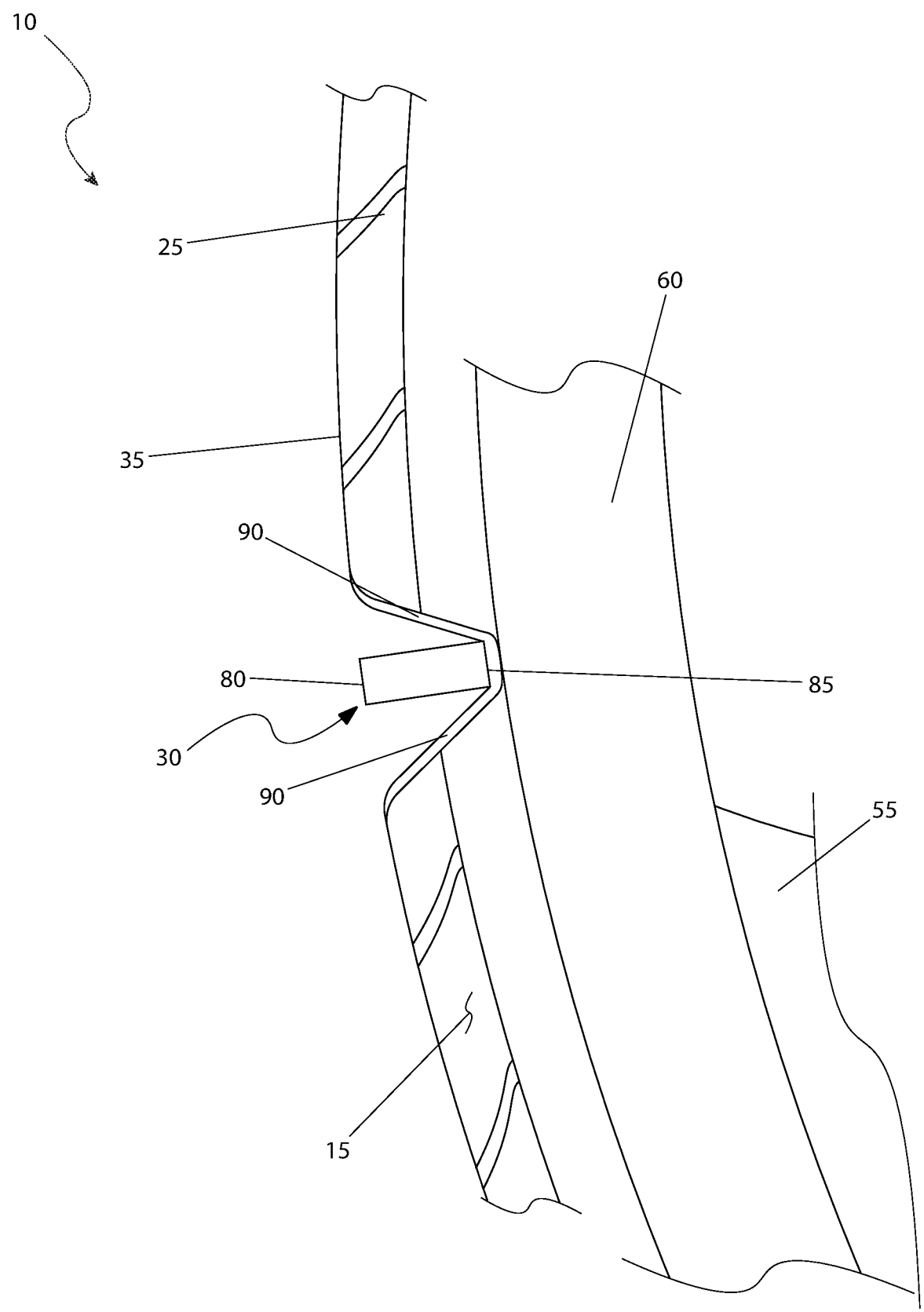
FIG. 4 is a sectional view of the expandable tire rim system, in a retracted state, as seen along a Line II-II, as shown in FIG. 1, according to the preferred embodiment of the present invention.

Referring next to FIG. 4, a sectional view of the system 10, in a retracted state, as seen along a Line II-II, as shown in FIG. 1, according to the preferred embodiment of the present invention is disclosed. This description discloses one (1) of the multiple extendable studs 30 provided on the tire 15 for purposes of operation. It is noted that all extendable studs 30 operate in the same manner. The outward surface 80 of the extendable studs 30 is flush with the wear surface 35 or outer tread pattern 25 of the tire 15. The extendable stud 30 is held in position by a flexible membrane 90 that connects the inward surface 85 to the tread pattern 25. The flexible membrane 90 is envisioned as being air-tight to allow for pressurization of the tire 15. The inward surface 85 of the extendable stud 30 rests against outer surface of the flexible membrane 90, or alternately is an integral part thereof. The inner surface of the flexible membrane 90 is contacted by the shoe assembly 60, with the shoe assembly 60 shown in a retracted state as shown in FIG. 2.

Figure 5:
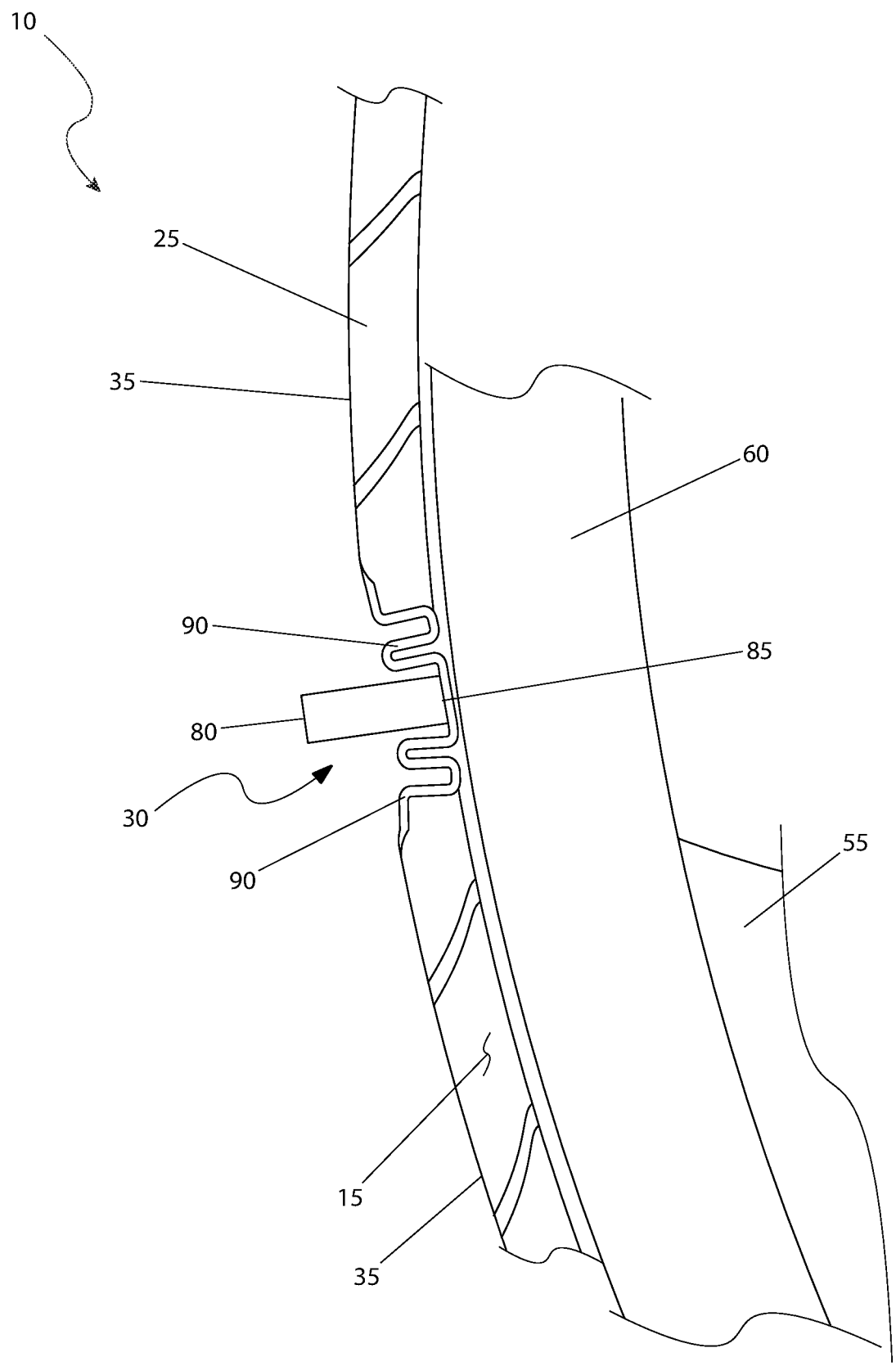
FIG. 5 is a sectional view of the expandable tire rim system, in an extended state, as seen along a Line II-II, as shown in FIG. 1, according to the preferred embodiment of the present invention.

Referring now to FIG. 5, a sectional view of the system 10, in an extended state, as seen along a Line II-II, as shown in FIG. 1, according to the preferred embodiment of the present invention is depicted. The outward surface 80 of the extendable stud 30 extends outward from the wear surface 35 or outer tread pattern 25 of the tire 15. The shoe assembly 60 is shown in an extended state as shown in FIG. 3. The extendable stud 30 travels outward when the flexible membrane 90 travels outward due to a force presented to it by the shoe assembly 60. The extendable stud 30 remains attached to the tire 15 by the flexible membrane 90 that is now in a folded state as shown, while retaining its air-tight properties.

Figure 6:
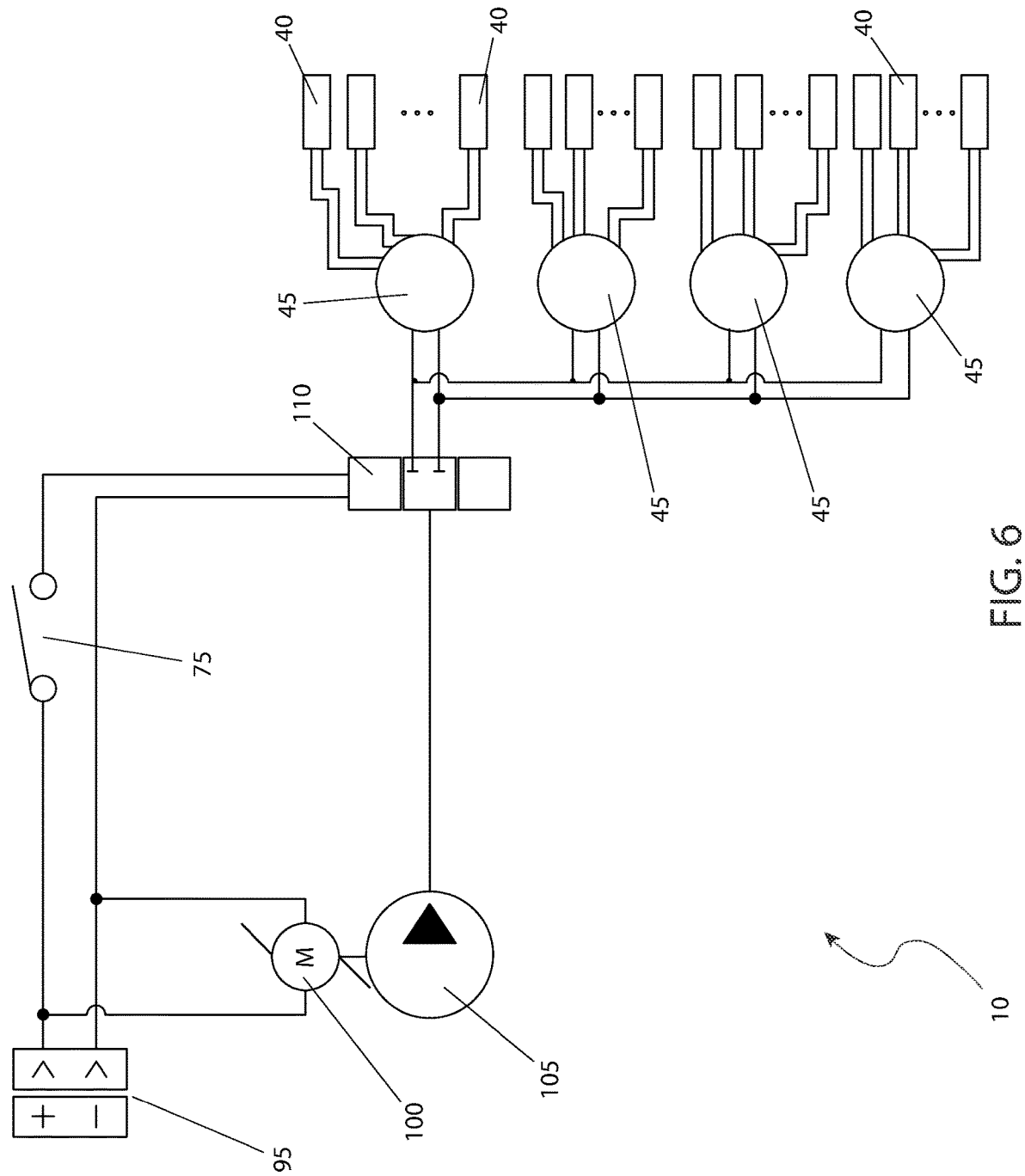
FIG. 6 is an electrical/mechanical block diagram of the expandable tire rim system, according to the preferred embodiment of the present invention.

Referring to FIG. 6, an electrical/mechanical block diagram of the system 10, according to the preferred embodiment of the present invention is shown. Electrical power is provided at an electrical power point 95, envisioned to be only energized with the vehicle ignition on. Electrical power then flows to an electric motor 100 which is mechanically and removably coupled to a hydraulic pump 105 located on the interior of the equipped motor vehicle. Power also flows in a parallel circuit manner to the dash-mounted switch 75 which controls operation of a hydraulic valve 110 which is in removable fluid communication between the hydraulic pump 105 and the rotating manifolds 45. Controlled hydraulic power then flows to the rotating manifolds 45, each of which are located at an individual tire 15 (as shown in FIG. 1) and capable of being removable therefrom. It is noted that the system 10 may be employed on all wheels of the vehicle or only the drive wheels depending on vehicle configuration and user preferences. From each rotating manifold 45, hydraulic power is routed to each hydraulic actuator 40 as aforementioned described.

2. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 6. While the present invention is viewed as standard or optional equipment on new vehicles, it is also envisioned that the present invention would be made available as an aftermarket kit for existing vehicles as well. As such, the user would procure the system 10 from conventional procurement channels such as vehicle showrooms, auto part stores, auto part aftermarket suppliers, mail order and internet supply houses and the like. Special attention would be paid to the specific size of the tire/rim system 10 such that it fits the subject vehicle.

After procurement and prior to utilization, the system 10 would be prepared in the following manner: the system 10 would require the addition of an electric motor 100, a hydraulic pump 105, a hydraulic valve 110 and a dash-mounted switch 75 to be installed on the subject vehicle as aforementioned described; each vehicle tire 15 or drive wheel would require the modification/installation of a rotating manifold 45 such that hydraulic power can be provided to the rotating components of the system 10; finally, the system 10 would be installed in a conventional manner. At this point in time the system 10 is ready for utilization.

During utilization of the system 10, the following procedure would be initiated: the system 10 will operate in a transparent manner to an ordinary vehicle; should substandard road conditions be encountered such as snow, ice, mud, or the like, the vehicle operator will close the dash-mounted switch 75 located on the dashboard or other location of the equipped vehicle; this action activates the electric motor 100 to control the hydraulic pump 105 and concurrently to control the hydraulic valve 110 to provide hydraulic power to the hydraulic actuators 40 through the rotating manifold 45, thus allowing the shoe assemblies 60 to contact the inner surfaces of the flexible membranes 90 and inward surfaces 85 of the extendable studs 30 to extend the extendable studs 30 outward; the protruding extendable studs then provide increased traction.

After use of the system 10, and the functionality of the extendable studs 30 is no longer required, the user can open the dash-mounted switch 75, thereby deactivating the hydraulic pump 105 and hydraulic valve 110 to cease the delivery of hydraulic power from the hydraulic actuators 40 and thus retracting the shoe assemblies 60. As the extendable studs 30 continue to contact the road surface, they will automatically retract as shown in FIG. 4, thus resetting the system 10 for future use in a cyclical manner.

These features provide for improved traction when needed to improve driving safety in manner that does not require leaving the vehicle or even stopping the vehicle. When not needed, a similar process allows for the retraction of the traction aid in a similar manner that provides for improved dry pavement handling, better mileage, and a reduction in pavement wear and tear.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An expandable tire rim system, comprising:
   a pneumatic tire mounted on a rim;
   a tread pattern disposed on a wear surface of the pneumatic tire; and
   a plurality of extendable studs extending from the wear surface of the pneumatic tire, an outward surface of the extendable studs are each flush with the wear surface of the pneumatic tire;
   wherein an interior of the rim houses a plurality of hydraulic actuators arranged in a radial pattern;
   wherein each of the hydraulic actuators are removably connected to a rotating manifold by a hydraulic hose;
   wherein each of the hydraulic actuators drive a piston that is mechanically and removably coupled to a respective shoe assembly;
   wherein each of the respective shoe assembles do not contact the extendable studs and allows for flexing of a tire sidewall and produce an improved smooth ride;
   wherein each of the respective shoe assemblies to drive the extendable studs outward where they protrude from the wear surface;
   wherein when increased traction is no longer required, a dash-mounted switch deactivates the respective shoe assemblies that are retracted and allowing the extendable studs to retract back into the wear surface;
   wherein the inward surface of each of the extendable studs rests against outer surface of the flexible membrane;
   wherein electrical power flows in a parallel circuit manner to a dash-mounted switch which controls operation of a hydraulic valve which is in removable fluid communication between the hydraulic pump and a plurality of rotating manifolds;
   wherein controlled hydraulic power then flows to each of the rotating manifolds located at the pneumatic tire;
   wherein each of the pistons are in an extended position as it drives the respective shoe assemblies outward along the shoe travel path;
   wherein the respective shoe assemblies are positioned within the tire and allow for the expandable tire rim system to be pressurized with air;
   wherein each of the respective shoe assemblies extend outwardly and inwardly along a shoe travel path;
   wherein the extendable stud is held in position by a flexible membrane that connects an inward surface of the pneumatic tire to the tread pattern;
   wherein the inner surface of the flexible membrane is contacted by the shoe assembly and with the shoe assembly;
   wherein the extendable stud travels outward when the flexible membrane travels outward due to a force presented to it by the shoe assembly;

wherein the extendable stud remains attached to the pneumatic tire by the flexible membrane that is in a folded state, while retaining its air-tight properties;

wherein the flexible membrane is air-tight to allow for pressurization of the pneumatic tire;

wherein electrical power is provided at an electrical power point energized with a equipped motor vehicle having the expandable tire rim system ignition on; and, wherein electrical power then flows to an electric motor which is mechanically and removably coupled to a hydraulic pump located on an interior of the equipped motor vehicle.

\* \* \* \* \*